(12) United States Patent
Nelakanti et al.

(10) Patent No.: US 9,684,650 B2
(45) Date of Patent: Jun. 20, 2017

(54) LANGUAGE MODEL WITH STRUCTURED PENALTY

(71) Applicant: Xerox Corporation, Norwalk, CT (US)

(72) Inventors: Anil Kumar Nelakanti, Meylan (FR); Guillaume M. Bouchard, Saint Martin le Vinoux (FR); Cedric Archambeau, Grenoble (FR); Francis Bach, Paris (FR); Julien Mairal, La Tronche (FR)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/482,035

(22) Filed: Sep. 10, 2014

(65) Prior Publication Data
US 2016/0070697 A1   Mar. 10, 2016

(51) Int. Cl.
*G06F 17/20* (2006.01)
*G06F 17/28* (2006.01)
*G06F 17/27* (2006.01)
*G10L 15/197* (2013.01)

(52) U.S. Cl.
CPC .......... *G06F 17/28* (2013.01); *G06F 17/2775* (2013.01); *G10L 15/197* (2013.01)

(58) Field of Classification Search
CPC ...... G06F 17/20; G06F 17/21; G06F 17/2241; G06F 17/2247; G06F 17/2252; G06F 17/27; G06F 17/2705; G06F 17/271; G06F 17/2715; G06F 17/28
USPC ............ 705/9, 1, 10, 255, 257; 704/9, 1, 10, 704/255, 257
See application file for complete search history.

(56) References Cited

U.S. PATENT DOCUMENTS

| | | | | |
|---|---|---|---|---|
| 5,822,730 | A * | 10/1998 | Roth | ........................ G10L 15/08 704/255 |
| 6,687,404 | B1 * | 2/2004 | Hull | ................... G06K 9/00442 382/180 |
| 2014/0337989 | A1 * | 11/2014 | Orsini | ..................... H04L 51/12 726/26 |

OTHER PUBLICATIONS

Bach, et al., "Optimization with sparsity-inducing penalties," Foundations and Trends in Machine Learning, pp. 1-106 (2012).
Beck, et al., "A fast iterative shrinkage-thresholding algorithm for linear inverse problems," SIAM Journal of Imaging Services, pp. 183-202 (2009).

(Continued)

Primary Examiner — Qi Han
(74) Attorney, Agent, or Firm — Fay Sharpe LLP (57) ABSTRACT

A penalized loss is optimized using a corpus of language samples respective to a set of parameters of a language model. The penalized loss includes a function measuring predictive accuracy of the language model respective to the corpus of language samples and a penalty comprising a tree-structured norm. The trained language model with optimized values for the parameters generated by the optimizing is applied to predict a symbol following sequence of symbols of the language modeled by the language model. In some embodiments the penalty comprises a tree-structured $l_p$-norm, such as a tree-structured $l_2$-norm or a tree-structured $l_\infty$-norm. In some embodiments a tree-structured $l_\infty$-norm operates on a collapsed suffix trie in which any series of suffixes of increasing lengths which are always observed in the same context are collapsed into a single node. The optimizing may be performed using a proximal step algorithm.

20 Claims, 6 Drawing Sheets

(56) References Cited

OTHER PUBLICATIONS

Bengio, et al., "A Neural Probabilistic Language Model," Journal of Maching Learning Research, 3 pp. 1137-1155 (2003).
Luks Burget, et al., "Analysis of feature extraction and channel compensation in a GMM speaker recognition system," IEEE Transactions on Audio, Speech and Language Processing, vol. 15, No. 7, pp. 1979-1986 (2007).
Chang, et al., "Exact Decoding of Phrase-Based Translation Models through Lagrangian Relaxation," Proc. Conf. on Empirical Methods for Natural Language Processing, pp. 26-37 (2011).
Cormen, et al., "Introduction to Algorithms," Second Edition MIT Press, pp. 330-354 (1990).
Dekel, et al., "Individual Sequence Prediction using Memory-efficient Context Trees," IEEE Transactions on Informatin Theory, vol. 55, No. 11, pp. 5251-5262 (2009).
Pietra, et al., "Inducing Features of Random Fields," IEEE Transactions on Pattern Analysis and Machine Intelligence, vol. 19, No. 4, pp. 380-393 (1997).
Duchi, et al., "Efficient Projections onto the $\ell_1$ -Ball for Learning in High Dimensions," Proc. $25^{th}$ Int. Conf. Machine Learning, pp. 1-8 (2008).
Gieferich, et al., "From Ukkonen to McCreight and Weiner: A Unifying View of Linear-Time Suffix Tree Construction," Algorthmica, pp. 1-22 (1997).
Goodman, "A Bit of Progress in Language Modeling," Extended Version, Proc. North American Chapter of the Association of Computational Linguistics, pp. 1-72 (2001).
Goodman, Expotential priors for maximum entropy models. Proc. North American Chapter of the Association of Computational Linguistics, pp. 1-8 (2004).
Hu, et al., "Accelerated Gradient Methods for Stochastic Optimization and Online Learning," Advances in Neural Information Processing Systems, pp. 1-9 (2009).
Jenatton, et al., "Proximal methods for hierarchical sparse coding," Journal of Machine Learning Research, pp. 2297-2334 (2011).
Martins, et al., "Structured sparsity in structured prediction," Proc. Conf. on Empirical Methods for Natural Language Processing, pp. 1500-1511 (2011).
Mnih, et al., "Three new graphical models for statistical language modeling," Proc. $24^{th}$ Int. Conference on Machine Learning, pp. 1-8 (2007).
Mnih, et al., "A scalable hierarchical distributed language model," Advances in Neural Information Processing Systems, pp. 1-8 (2008).
Nesterov, "Gradient methods for minimizing composite objective function," CORE Discussion Paper, pp. 1-30 (2007).
Roark, et al., "Discriminative Language Modeling with Conditional Random Fields and the Perceptron Algorithm," Proc. Association for Computation Linguistics, pp. 1-8 (2004).
Stolcke, "SRILM—An Extensible Language Modeling Toolkit," Proc. Int. Conf. Spoken Language Processing, Second Edition, pp. 1-4 (2002).
Vargas, et al., "Explicit relevance models in intent-oriented information retrieval diversification," Proc. $35^{th}$ Int. ACM SI-GIR '12, pp. 75-84 (2012).
Wood, et al., "A Stochastic Memoizer for Sequence Data," Proc. $26^{th}$ Intl. Conf. on Machine Learning, pp. 1-8 (2009).
Wood, et al., "The sequence memoizer," Communications of the ACM, vol. 54, pp. 91-98 (2011).
Wu, et al., "Efficient training methods for maximum entropy language modeling," Proc. $6^{th}$ Inter. Conf. Spoken Language Technologies, pp. 114-117 (2000).
Zhao, et al., "The Composite Absolute Penalties Family for Grouped abd Hierarchical Variable Selection," The Annals of Statistics, vol. 37, No. 6A pp. 3468-3497 (2009).

* cited by examiner

FIG. 1

TRIE-STRUCTURED VECTOR
w = [3 4 6 6 4 5 7 7]$^T$

FIG. 2

TREE-STRUCTURED VECTOR
w = [3 4 6 6 4 5 7 7]$^T$

FIG. 3

$\ell_2^T$-PROXIMAL $\Pi_{\ell_2^T}$(w, 0.8) =

$\ell_\infty^T$-PROXIMAL $\Pi_{\ell_\infty^T}$(w, 0.8) =

LANGUAGE MODEL WITH STRUCTURED PENALTY

BACKGROUND

The following relates to the language modeling arts, language processing arts, and related arts.

Language models are employed in natural language processing pipelines for applications such as speech recognition, machine translation, information retrieval, and so forth. Given an observed sequence of symbols, a language model predicts the probability of occurrence of the next symbol in the sequence. By way of illustration, in a language model for a written natural language, the symbols are typically words (e.g. in languages such as English or French) or characters or glyphs (e.g. in languages such as Chinese). In modeling of spoken language audio, the symbols are suitably audio segments corresponding to spoken words of the natural language.

Language models based on back-off smoothing have been developed which have demonstrated good predictive power, such as Kneser-Ney (KN) language models and variants thereof. Smoothing-based language models are heuristically based, and typically have numerous tuning parameters that are adjust in an ad-hoc fashion. Other approaches for learning language models have been proposed based on maximum entropy, conditional random field, or Bayesian approaches.

BRIEF DESCRIPTION

In some illustrative embodiments disclosed as illustrative examples herein, a non-transitory storage medium stores instructions readable and executable by an electronic data processing device to perform a method including the operations of: optimizing a penalized loss $\operatorname{argmin}_W f(W) + \lambda \Omega(W)$ using a corpus of language samples respective to a set of parameters $W=\{w_v\}_{v \in V}$ of a language model, where V is a vocabulary, $f(W)$ is a function measuring predictive accuracy of the language model respective to the corpus of language samples, $\Omega(W)$ is a penalty comprising a tree-structured norm, and $\lambda$ is a regularization parameter; and outputting a trained language model with optimized values for the parameters W generated by the optimizing. In some embodiments the penalty $\Omega(W)$ comprises $l_p^T(w) = \sum_{j \in \mathcal{G}} \|g(w,j)\|_p$ where $\|\cdot\|_p$ denotes the $l_p$-norm, $g(w,j)$ is the sub-vector of w associated with the subtree rooted at node j of the suffix trie T of a language sample of the corpus, and g is an ordered set of nodes of the suffix trie. The penalty $\Omega(W)$ may comprise $l_2^T(w) = \sum_{j \in \mathcal{G}} \|g(w,j)\|_2$ where $\|\cdot\|_2$ denotes the $l_2$-norm. The penalty $\Omega(W)$ comprises $l_\infty^T(w) = \sum_{j \in \mathcal{G}} \|g(w,j)\|_\infty$ where $\|\cdot\|_\infty$ denotes the $l_\infty$-norm, and optionally the suffix trie comprises a collapsed suffix trie in which any series of suffixes of increasing lengths which are always observed in the same context are collapsed into a single node. In some embodiments the optimizing is performed using a proximal step algorithm.

In some illustrative embodiments disclosed as illustrative examples herein, an apparatus comprises a non-transitory storage medium as set forth in the immediately preceding paragraph and an electronic data processing device operatively connected to read and execute the instructions stored on the non-transitory storage medium.

In some illustrative embodiments disclosed as illustrative examples herein, a method comprises: optimizing a penalized loss using a corpus of language samples respective to a set of parameters of a language model wherein the penalized loss includes a function measuring predictive accuracy of the language model respective to the corpus of language samples and a penalty comprising a tree-structured norm; and applying the trained language model with optimized values for the parameters generated by the optimizing to predict a symbol following sequence of symbols of the language modeled by the language model. The optimization and the applying are suitably performed by an electronic data processing device. In some embodiments the penalty comprises a tree-structured $l_p$-norm, such as a tree-structured $l_2$-norm or a tree-structured $l_\infty$-norm. In some embodiments a tree-structured $l_\infty$-norm operates on a collapsed suffix trie in which any series of suffixes of increasing lengths which are always observed in the same context are collapsed into a single node. The optimizing may be performed using a proximal step algorithm.

DETAILED DESCRIPTION

Disclosed herein are language models learned using penalized maximum likelihood estimation in log-linear models. A convex objective function is optimized using approaches for which polynomial-time algorithms are derived. In contrast to language models based on unstructured norms such as $l_2$ (quadratic penalties) or $l_1$ (absolute discounting), the disclosed approaches employ tree-structured norms that mimic the nested nature of word contexts and provide an efficient framework for the disclosed language models. In some embodiments, structured $l_\infty$ tree norms are employed with a complexity nearly linear in the number of nodes. This leads to an memory-efficient and time-efficient learning algorithm for generalized linear language models. In a further aspect, the optimization is performed using a proximal algorithm that is adapted to be able to scale with the large dimensionality of the feature space commonly employed in language model training (e.g., vocabularies of order thousands to tens of thousands of words, and context sample sizes on the order of $10^5$ or larger for some typical natural language model learning tasks).

Figure 1:
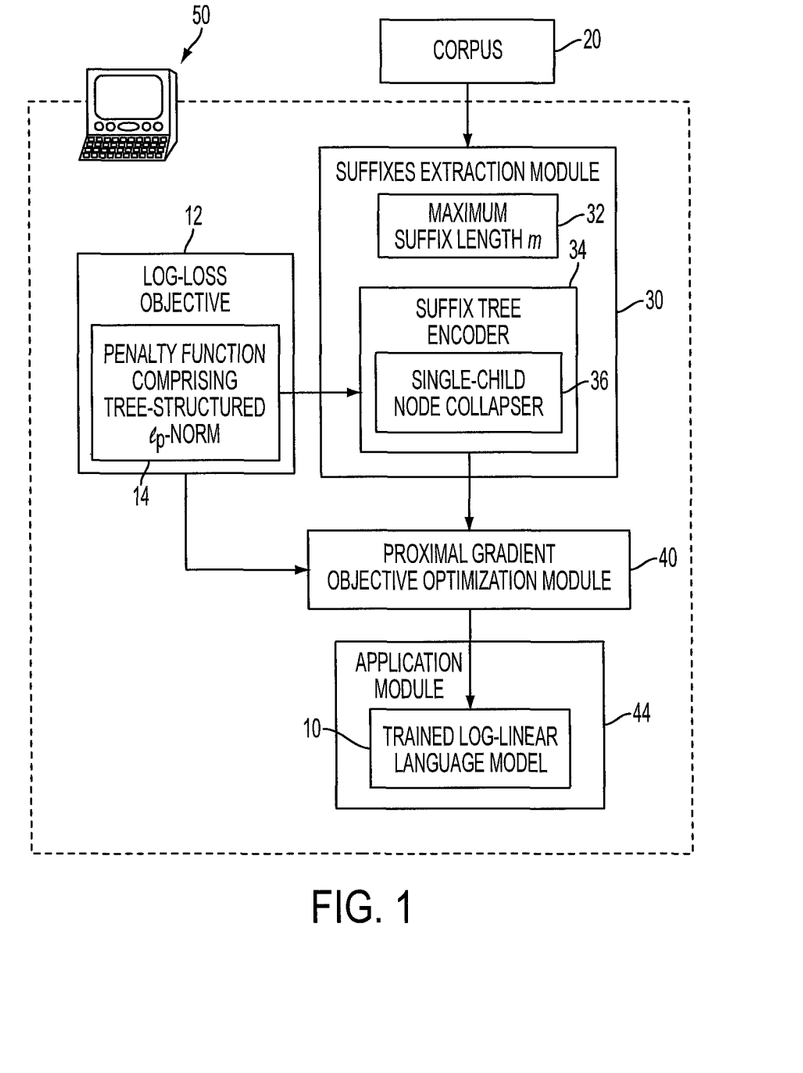
FIG. 1 diagrammatically shows a language model learning system.

With reference to FIG. 1, the illustrative embodiments employ log-linear language models. Multinomial logistic regression and Poisson regression are examples of log-linear models. The likelihood in this class of models belongs to an exponential family, the predictor being linear. Without loss of generality, the following notation is employed. Let V be a set of words (or, more generally, symbols) called the vocabulary. Further, let xy be a sequence of n+1 symbols of V, where $x \in V^n$ and $y \in V$. A log-linear language model 10 computes the probability that symbol y succeeds x according to:

$$P(y = v \mid x) = \frac{e^{w_v^T \phi_m(x)}}{\sum_{u \in V} e^{w_u^T \phi_m(x)}} \quad (1)$$

where the superscript "T" denotes transpose, $W=\{w_v\}_{v \in V}$ is the set of parameters (where again V is the vocabulary and $v \in V$ is an element, i.e. word or symbol, of the vocabulary), and $\phi_m(x)$ is the vector of features extracted from x (the sequence preceding y).

Let denote the subsequence of x starting at the first position up to the $i^{th}$ position and $y_i$ the next symbol in the sequence. Parameters are estimated by minimizing the penalized log-loss 12:

$$W* \in \underset{W \in \mathcal{K}}{\operatorname{argmin}} f(W) + \lambda \Omega(W) \quad (2)$$

where $f(W):=-\Sigma_{i=1}^n \ln p(y_i|x_{1:i}; W)$ and $p(y_i|x_{1:i}; W)$ denotes the probability of word $y_i$ following suffix $x_{1:i}$ predicted by the language model with parameters W and $\mathcal{K}$ is a convex set representing the constraints applied on the parameters. (While a log-loss function is used in the illustrative embodiments, other loss functions can be employed as the function $f(W)$). Overfitting is avoided by adjusting the regularization parameter $\lambda$, for example by cross-validation. The penalized log-loss objective 12 includes a penalty term $\Omega(W)$ 14, which in some illustrative embodiments is a tree-structured $l_p$ norm. For notational convenience, a tree-structured $l_p$ norm is also denoted herein by the notation $l_p^T$ where the superscript "T" denotes "tree-structured".

The feature vector $\phi_m(x)$ encodes suffixes (or contexts) of increasing length up to a maximum length m. Hence, the model defined in Equation (1) is similar to m-gram language models. In the illustrative embodiments, the feature vectors are encoded using suffix trees.

Suffix trees provide an efficient way to store and manipulate discrete sequences and can be constructed in linear time when the vocabulary is fixed. The suffix tree data structure encodes all the unique suffixes observed in sequences up to a maximum given length (denoted herein as m) in a corpus 20. (It is also contemplated to employ unbounded embodiments, i.e. m=∞, for which $l_p^T$-norms can still be computed). It exploits the fact that the set of observed contexts in the corpus 20 is a small subset of all possible contexts. When a series of suffixes of increasing lengths are always observed in the same context, the successive suffixes can be collapsed into a single node. The uncollapsed version of the suffix tree T is called a suffix trie, which is denoted herein as S. A suffix trie also has a tree structure, but it potentially has much larger number of nodes.

Figure 2:
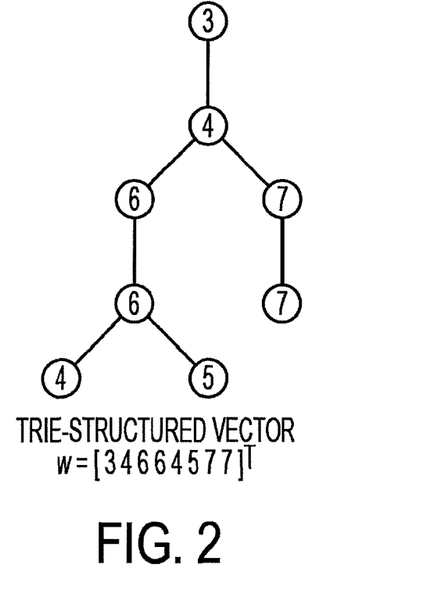
FIGS. 2, 3, 4, and 5 diagrammatically show an illustrative trie structured vector (FIG. 2) and corresponding collapsed tree structured vector (FIG. 3), and the corresponding vector after proximal projection for the $l_2^T$-norm (FIG. 4) and for the $l_\infty^T$-norm (FIG. 5).
Figure 3:
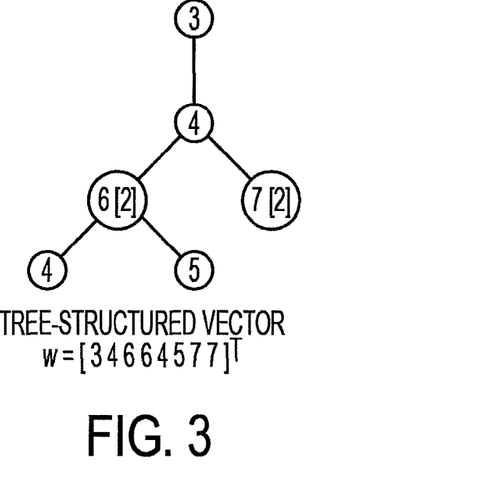

With brief reference to FIGS. 2 and 3, an example of a suffix trie S is given in FIG. 2, and the associated suffix tree T is shown in FIG. 3. The notation |S| is used herein to denote the number of nodes in the trie S and the notation |T| is used herein to denote the number of nodes in the tree T. Suffix tree encoding is advantageous in applications in which the resulting hierarchical structures are thin and tall with numerous non-branching paths. In the case of text, the number of nodes in the tree grows slower than that of the trie with the length of the sequence, due to the reduction in nodes afforded by node collapsing. This provides substantial gains in memory requirements and computational speed when this structure is exploited.

The feature vector $\phi_m(x)$ corresponds to one path of length m starting at the root of the suffix trie S. The entries in W correspond to weights for each suffix. This provides a trie structure S on W (see FIG. 2) constraining the number of free parameters. In other words, there is one weight parameter per node in the trie S and the matrix of parameters W is of size |S|.

Also disclosed herein are language models in which the number of parameters is equal to the size of the suffix tree T, which has significantly fewer nodes than the trie S. This is achieved by ensuring that all parameters corresponding to suffixes at a node share the same parameter value (see FIG. 3). These parameters correspond to paths in the suffix trie S (e.g. FIG. 2) that do not branch i.e. sequence of words that always appear together in the same order in the corpus 20. When considering tree-structured penalties, W is initialized to bear this property and the parameter optimization is performed so as to ensure that after each iteration of the minimization of the penalized loss of Equation (2) this property still holds.

With continuing reference to FIG. 1, in one illustrative embodiment the log-loss objective function 12 includes a smooth convex loss $f$ and a possibly non-smooth penalty depending on the choice of the penalization $\Omega$. To minimize the log-loss objective 12, gradient descent can be employed for smooth penalties, with a switch to subgradient methods for non-smooth penalties. However, subgradient methods can be very slow to converge. In illustrative embodiments disclosed herein, proximal methods are employed for the minimization, as they exhibit good convergence rate as compared with other first-order techniques. Proximal methods also provide the ability to reuse specialized algorithms for different penalties by changing the proximal step.

Proximal methods iteratively update the current estimate by making a generalized gradient update at each iteration. Formally, they are based on a linearization of the objective function $f$ about the parameter estimate $\overline{W}$, adding a quadratic penalty term to keep the updated estimate in the neighborhood of the current estimate. At iteration t, the update of the parameter W is given by:

$$W^{t+1} = \underset{W \in \mathcal{K}}{\operatorname{argmin}} \left\{ f(\overline{W}) + (W - \overline{W})^T \nabla f(\overline{W}) + \lambda \Omega(W) + \frac{L}{2} \|W - \overline{W}\|_2^2 \right\} \quad (3)$$

where $\|\ldots\|_2^2$ denotes $l_2$-norm the raised to the power 2 and L>0 is an upper bound on the Lipschitz constant of the gradient $\nabla f(\overline{W})$. The matrix $\overline{W}$ can be the current estimate $W^t$ or its weighted combination with the previous estimate $W^{t-1}$ for accelerated convergence. Equation (3) can be rewritten to be solved in two independent steps: a gradient update from the smooth part:

$$W' = \overline{W} - \frac{1}{L} \nabla f(\overline{W}) \quad (4)$$

followed by a projection depending only on the non-smooth penalty $$W^{t+1} = \underset{W \in \mathcal{K}}{\operatorname{argmin}} \frac{1}{2} \|W - W'\|_2^2 + \frac{\lambda \Omega(W)}{L} \quad (5)$$

The update of Equation (5) is called the proximal operator of W' with parameter $$\frac{\lambda}{L}$$

that is denoted herein as $$\prod_{\Omega}\left(W', \frac{\lambda}{L}\right).$$

Efficiently computing the proximal step facilitates maintaining the fast convergence rates of proximal methods.

In language modelling applications, the number of training samples n in the corpus 20 is typically large, e.g. typically in the range of $10^5$ or larger. To accommodate learning the language model 10 on such large corpus 20, an accelerated stochastic version of the proximal methods is employed. See Hu et al., "Accelerated gradient methods for stochastic optimization and online learning", *Advances in Neural Information Processing Systems* (2009). At every update, the stochastic algorithm estimates the gradient on a mini-batch, that is, a subset of the samples. The size of the mini-batches controls the trade-off between the variance in the estimate of gradient and the time required for compute it. In experiments reported herein, mini-batches of size 400 were used. The training algorithm is summarized in Algorithm 1. The acceleration is obtained by making the gradient update at a specific weighted combination of the current and the previous estimates of the parameters. The weighting is shown in step 6 of the Algorithm 1.

---

Algorithm 1 W* := argmin {f(X, Y; W) + λΩ(W)} Stochastic optimization algorithm (Hu et al., 2009)

1 Input: λ regularization parameter, L Lipschitz constant of $\nabla$f, μ coefficient of strong-convexity of f + λΩ, X design matrix, Y label set
2 Initialize: $\overline{W} = Z = 0$, τ = δ = 1, ρ = L + μ
3 repeat until maximum iterations
4   #estimate point for gradient update
    $\overline{W} = (1 - \tau)W + \tau Z$
5   #use mini-batch $\{X_\vartheta, Y_\vartheta\}$ for update
    W = ParamUpdate($X_\vartheta, Y_\vartheta, \overline{W}, \lambda, \rho$)
6   #weighted combination of estimates
    $Z = \frac{1}{\rho\tau + \mu}((1 - \mu)Z + (\mu - \rho)\overline{W} + \rho W)$
7   #update constants
    $\rho = L + \mu/\delta, \tau = \frac{\sqrt{4\delta + \delta^2} - \delta}{2}, \delta = (1 - \tau)\delta$ Procedure: W := ParamUpdate($X_\vartheta, Y_\vartheta, \overline{W}, \lambda, \rho$)

1   $W' = \overline{W} - \frac{1}{\rho}\nabla f(X_\vartheta, Y_\vartheta, \overline{W})$ #gradient step
2   W = [W]$_+$   #projection to non-negative orthant
3   W = $\Pi_\Omega$(w, κ)   #proximal step

---

Without constraining the parameters, the memory required by a model scales linearly with the vocabulary size |V|. Any symbol in V observed in a given context is a positive example, while any symbol in V that does not appear in this context is a negative example. When adopting a log-linear language model, the negative examples are associated with a small negative gradient step in Equation (4), so that the solution is not sparse across multiple categories in general. On the other hand, by constraining the parameters to be positive (i.e., the set of feasible solutions $\mathcal{K}$ is the positive orthant), the projection step 2 in Algorithm 1 can be done with the same complexity, while maintaining sparse parameters across multiple categories. More precisely, the weights for the category k associated to a given context x, is always zeros if the category k never occurred after context x. A significant gain in memory (nearly |V|-fold for large context lengths) was obtained without loss of accuracy in experiments reported herein.

Some illustrative embodiments of the penalty function Ω(W) are set forth in the following.

Standard choices for the penalty function Ω(W) include the $l_1$-norm and the squared $l_2$-norm. The $l_1$-norm typically leads to a solution that is sparse and easily interpretable, while the squared $l_2$-norm leads to a non-sparse solution, which is generally more stable than the sparse solution provided by the $l_1$-norm. The unweighted $l_2$ and $l_1$ penalties have been used in the context of log-linear language models (Chen et al., "A survey of smoothing techniques for ME models", *IEEE Transactions on Speech and Audio Processing*, vol. 8 no. 1 (2002); Goodman, "Exponential priors for maximum entropy models", in *Proc. North American Chapter of the Association of Computational Linguistics* (2004)), reporting performances competitive with bi-gram and tri-gram interpolated Kneser-Ney smoothing.

In the following, it is shown that the proximal step can be independently distributed on each individual node. This property can be used to group parameter values corresponding to features that are always equal, that is to say the contexts which always occur in the same larger context (i.e. parents with a single child in the suffix tree). Nodes having always the same values in a suffix trie can be collapsed using Ukkonen's linear-time online suffix tree algorithm, leading to a proximal step with a complexity that scales linearly with the number of symbols seen in the corpus.

For unweighted $l_2$ penalties, the proximal step is the element-wise rescaling of the vector, i.e. the proximal step $$\prod_{\ell_2^2}\left(w', \frac{\kappa}{2}\right)$$

is the element-wise rescaling operation:

$$w_i^{(t+1)} \leftarrow w_i^{(t)}(1+\kappa)^{-1} \quad (6)$$

For $l_1$ penalties, the proximal step $$\prod_{\ell_1}\left(w', \frac{\kappa}{2}\right)$$

is the soft-thresholding operator:

$$w_i^{(t+1)} \leftarrow \max(0, w_i^{(t)} - \kappa) \quad (7)$$

These projections have linear complexity in the number of features and can be encoded efficiently by grouping together features that will have the same value at every iteration of the optimization.

The $l_1$ and squared $l_2$ penalties do not account for the sequential dependencies in the data, treating suffixes of different lengths equally. For language models, this is inappropriate considering that longer suffixes are typically observed less frequently than shorter ones. Moreover, the fact that suffixes might be nested is disregarded in the $l_1$ and squared $l_2$ penalties.

As disclosed herein, by replacing the unstructured penalties with tree-structured norm penalties (see Zhao et al., "The composite absolute penalties family for grouped and hierarchical variable selection", *The Annals of Statistics* vol. 37(6A) pages 3468-97 (2009); Jenatton et al., "Proximal methods for hierarchical sparse coding", *Journal of Machine Learning Research*, pages 2297-2334 (2011)), these deficiencies are overcome. The tree-structured norms are based on the suffix trie or tree, where subtrees correspond to contexts of increasing lengths. As shown in experiments reported herein, this prevents model overfitting (unlike the unweighted $l_1$ or squared $l_2$ norm).

The tree-structured $l_p^T$ norms are defined as follows. Let x be a training sequence. Group g(w,j) is the subvector of w associated with the subtree rooted at the node j of the suffix trie S(x). Further, let $\mathcal{G}$ denote the ordered set of nodes of the tree T(x) such that for r<s, g(w,r)∩g(w,s)=∅ or g(w,r)⊂g(w,s). The tree-structured $l_p$ norm (also denoted herein as the $l_p^T$ norm) is defined as follows:

$$\ell_p^T(w) = \sum_{j \in \mathcal{G}} \|g(w, j)\|_p \tag{8}$$

where $\|\bullet\|_p$ denotes the $l_p$-norm. In illustrative embodiments disclosed herein, the cases of p=2 and p=∞ are considered. For these values of p, efficient optimization algorithms are available. The $l_p^T$-norms can be viewed as a group sparsity-inducing norms, where the groups are organized in a tree. This means that when the weight associated with a parent in the tree is driven to zero, the weights associated to all its descendants should also be driven to zero. The $l_\infty^T$-norm also corresponds to a group thresholding operator.

For a structured $l_p^T$-norm, the proximal step (Equation (5)) amounts to residuals of recursive projections on the $l_q$-ball in the order defined by $\mathcal{G}$ where $l_q$-norm is the dual norm of $l_p$-norm. (More particularly, the $l_p$-norm and $l_q$-norm are dual to each other if $$\frac{1}{p} + \frac{1}{q} = 1.$$

The $l_2$-norm is self-dual while the dual of the $l_\infty$-norm is the $l_1$-norm.) In the case of the $l_2^T$-norm this amounts to a series of projections on the $l_2$-ball. For the $l_\infty^T$-norm it is instead projections on the $l_1$-ball. The order of projections defined by $\mathcal{G}$ is generated by an upward pass of the suffix trie. At each node through the upward pass, the subtree below is projected on the dual norm ball of size κ, the parameter of the proximal step. The projections on the norm ball are further described in the following.

Each of the above projections on the dual norm ball takes one of the following forms depending on the choice of the norm. Projection of vector w on the $l_2$-ball is equivalent to thresholding the magnitude of w by κ units while retaining its direction:

$$w \leftarrow [\|w\|_2 - \kappa]_+ \times \frac{w}{\|w\|_2} \tag{9}$$

where $[a]_+$ is a thresholding operator equaling 0 is a is negative and equaling a otherwise. This can be performed in time linear in size of w, O(|w|). Projection of a non-negative vector w on the $l_1$-ball is more involved and requires thresholding by a value such that the entries in the resulting vector add up to κ, otherwise w remains the same:

$$w \leftarrow [w-\tau]_+, s.t. \|w\|_1 = \kappa \text{ or } \tau = 0 \tag{10}$$

The condition τ=0 is the case where w lies inside the $l_1$-ball of size κ with $\|w\|_1 < \kappa$, leaving w intact. In the other case, the threshold τ is to be computed such that after thresholding, the resulting vector has an $l_1$-norm of κ. One way to achieve this is to sort by decending order the entries $\overline{w}$=sort(w) and select the k largest values such that the $(k+1)^{th}$ largest entry is smaller than τ:

$$\sum_{i=1}^{k} \overline{w}_i - \tau = \kappa \tag{11}$$

and $$\tau > \overline{w}_{k+1}$$

The parameter $\overline{w}_k$ is referred to herein as the pivot. Only entries larger than the pivot $\overline{w}_k$ are of interest. Given a sorted vector, it requires looking up to exactly k entries, however, the sorting process itself takes O(|w|log|w|).

---

Algorithm 2 w := $\Pi_{l_2}^T$ (w, κ) Proximal projection step for $l_2^T$ on grouping $\mathcal{G}$.

1  Input: T suffix tree, w trie-structured vector, κ threshold
2  Initialize: {$\gamma_i$} = 0, {$\eta_i$} = 1
3  η = UpwardPass(η, γ, κ, w)
4  w = DownwardPass(η, w)
   Procedure: η := UpwardPass(η, γ, κ, w)
1  for x ∈ DepthFirstSuffixTraversal(T, PostOrder)
2    $\gamma_x = w_x^2 + \Sigma_{h \in children(x)} \gamma h$
3    $\eta_x = [1 - \kappa/\sqrt{\gamma_x}]_+$
4    $\gamma_x = \eta_x^2 \gamma_x$
   Procedure: w := DownwardPass(η, w)
1  for x ∈ DepthFirstSuffixTraversal(T, PreOrder)
2    $w_x = \eta_x w_x$
3    for h ∈ children(x)
4      $\eta_h = \eta_x \eta_h$
a  DepthFirstSuffixTraversal(T,Order) returns observed suffixes from the suffix tree T by depth-first traversal in the order prescribed by Order.
b  $w_x$ is the weights corresponding to the suffix x from the weight vector w and children(x) returns all the immediate children to suffix x in the tree.

---

Naively employing the projection on the $l_2$-ball described above leads to an $O(d^2)$ algorithm for $l_2^T$ proximal step. This could be improved to a linear algorithm by aggregating all necessary scaling factors while making an upward pass of the trie S and applying them in a single downward pass as described in Jenatton et al., "Proximal methods for hierarchical sparse coding", *Journal of Machine Learning Research*, pages 2297-2334 (2011). In Algorithm 2, this procedure is detailed for trie-structured vectors.

Algorithm 3 w := $\Pi_{l_\infty^T}$ (w, κ) Proximal projection
step for $l_\infty^T$ on grouping $\mathcal{G}$.

```
Input: T suffix tree, w = [υ c] tree-structured vector υ with
   corresponding number of suffixes collapsed at each node in
   c, κ threshold
1 for x ∈ DepthFirstNodeTraversal(T, PostOrder)
2     g(υ, x) := π_{l_∞^T} (g(υ, x), c_x κ)
   Procedure: q := π_{l_∞} (q, κ)
   Input: q = [υ c], q_i = [υ_i c_i], i = 1, . . . , |q|
   Initialize: U = { }, L = { }, I = {1, . . . , |q|}
1 while I ≠ ∅
2     pick random ρ ∈ I           #choose pivot
3     U = {j|υ_j ≥ υ_ρ}           #larger than υ_ρ
4     L = {j|υ_j < υ_ρ}           #smaller than υ_ρ
5     δS = Σ_{i∈U} υ_i · c_i, δC = Σ_{i∈U} c_i
6     if (S + δS) − (C + δC)ρ < κ
7        S := (S + δS), C := (C + δC), I := L
8     else I := U\{ρ}

9  r = (S − κ)/C,  υ_i := υ_i − max(0, υ_i − r)  #take residuals
``` a DepthFirstNodeTraversal(T, Order) returns nodes x from the suffix tree T by depth-first traversal in the order prescribed by Order.

The complexity of $l_\infty^T$-norm proximal step depends directly on that of the pivot finding algorithm used within its $l_1$-projection method. Naively sorting vectors to find the pivot leads to an O($d^2$ log d) algorithm. Pivot finding can be improved by randomly choosing candidates for the pivot, and a known algorithm using this approach (Bruckner, "An o(n) algorithm for quadratic knapsack problems", Operations Research Letters, vol. 3 pages 163-166 (1984)) has amortized linear time complexity in the size of the vector. This provides O($d^2$) complexity for $l_\infty^T$-norm proximal step. Another approach (Duche et al., "Efficient projections onto the $l_1$-ball for learning in high dimensions", Proc. 25$^{th}$ Int. Conf. Machine Learning (2008)) proposes a method that scales linearly with the number of non-zero entries in the gradient update (s) but logarithmically in d. But recursive calls to $l_1$-projection over subtrees will fail the sparsity assumption (with s≈d) making proximal step quadratic. A suitable procedure for $\Pi_{l_\infty^T}$ on trie-structured vectors using randomized pivoting method is set forth in Algorithm 3.

In the following, approaches are disclosed for reducing the number of $l_1$-projections by switching to the tree T instead of trie S which is possible due to advantageous properties of the $l_\infty^T$-norm. A pivot finding method is then disclosed that is logarithmic in the feature size for the illustrative language modeling application.

The case is considered in which all parameters are initialized with the same value for the optimization procedure, typically with zeros. The condition that the parameters at any given node continue to share the same value requires that both the gradient update of Equation (4) and the proximal step of Equation (5) have this property. To achieve this, the tree structure is modified to ensure that after gradient updates parameters at a given node continue to share a single value. Nodes that do not share a value after gradient update are split into multiple nodes where each node has a single value. This property is formally defined as follows. A constant value non-branching path is a set of nodes P∈$\mathcal{P}$(T,w) of a tree structure T with respect to vector w if P has |P| nodes with |P|−1 edges between them and each node has at most one child and all nodes i,j∈P have the same value in vector w as $w_i = w_j$.

With reference again to FIGS. 2 and 3, the nodes of the tree T of FIG. 3 correspond to constant value non-branching paths when the values for all parameters at each of the nodes are the same. In the following it is shown that this tree structure is retained after proximal steps of $l_\infty^T$-norm.

Figure 4:
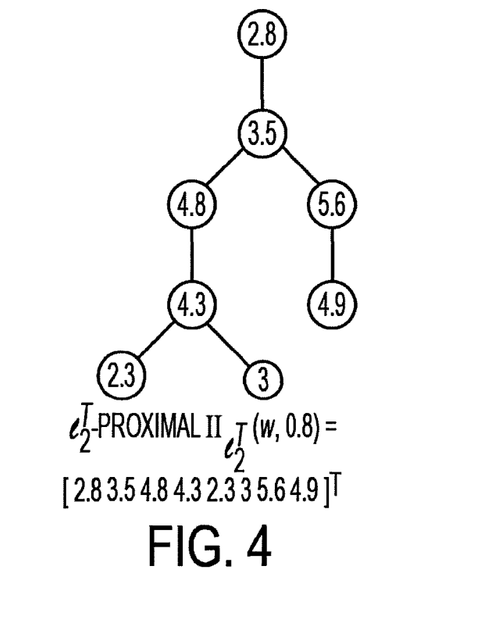
Figure 5:
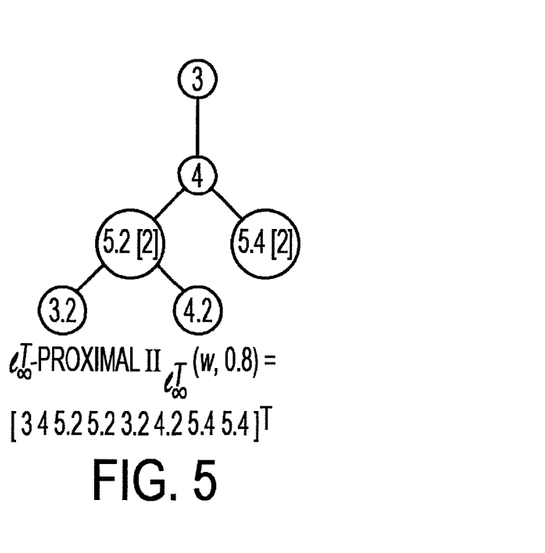

With continuing reference to FIGS. 2 and 3 and with further reference to FIGS. 4 and 5, the following proposition is shown: Proposition 1: Constant value non-branching paths $\mathcal{P}$(T,w) of T structured vector w are preserved under the proximal projection step $\Pi_{l_\infty^T}$(w,κ). For illustration, FIG. 2 shows an example of an uncollapsed (trie), and FIG. 3 shows the corresponding collapsed (tree) structured vectors and proximal operators applied to them. Weight values are written inside the node. FIG. 2 shows the complete trie S. FIG. 3 shows the corresponding collapsed tree T. The number in the brackets shows the number of nodes collapsed. FIG. 4 shows the vector after proximal projection for the $l_2^T$-norm, which cannot be collapsed. FIG. 5 shows the vector after proximal projection for the $l_\infty^T$-norm, which can be collapsed.

FIG. 5 illustrates Proposition 1, showing $l_\infty^T$ projection applied on the collapsed tree. This makes it memory efficient but the time required for the proximal step remains the same since each subtree of the trie S must be projected on the $l_1$-ball. The sequence of projections at nodes of S in a non-branching path can be rewritten into a single projection step using the following technique bringing the number of projections from |S| to |T|.

Proposition 2: Successive projection steps for subtrees with root in a constant value non-branching path P={$g_1$, . . . , $g_{|P|}$}∈$\mathcal{P}$(T,w) for $\Pi_{l_\infty^T}$(w,κ) is $\pi_{g_{|P|}}$ ∘ . . . ∘$\pi_{g_1}$(w,κ) applied in bottom-up order defined by $\mathcal{G}$. The composition of projections can be rewritten into a single projection step with κ scaled by the number of projections |P|, as:

$$\pi_{g_{|P|}}(w, \kappa |P|) = \pi_{g_{|P|}} \circ \ldots \circ \pi_{g_1} \qquad (12)$$

The above propositions show that $l_\infty^T$-norm can be used with the suffix tree T with fewer projection steps. In the following, a fast proximal step algorithm for $l_\infty^T$-norm is described.

Let k be the cardinality of the set of values larger than the pivot in a vector to compute the threshold for $l_1$-projection as referred in Equation (11). This value varies from one application to another, but for language applications, experiments reported herein on 100,000 English words (APNews dataset) showed that k is generally small: its value is on average 2.5, and its maximum is around 10 and 20, depending on the regularization level. In the illustrative embodiments, a max-heap data structure (Cormen et al., An introduction to Algorithms, MIT Press 1990) is employed to fetch the k-largest values necessary to compute the threshold. Given the heap of the entries the cost of finding the pivot is O(k log d) if the pivot is the k$^{th}$ largest entry and there are d features. This operation is performed d times for $l_\infty^T$-norm as the tree is traversed bottom-up. The heap itself is built on the fly during this upward pass. At each subtree, the heap is built by merging those of their children in constant time by using Fibonacci heaps. This leaves us with a O(dk log d) complexity for the proximal step. This procedure is detailed in Algorithm 4.

Table 1 summarizes the characteristics of the algorithms associated to the different penalties. In Table 1, generalization properties are as compared by their performance with increasing context length. Memory efficiency is measured by the number of free parameters of W in the optimization. Note that the suffix tree is much smaller than the trie (uncollapsed tree), that is, |T|<<|S|. Time complexities reported are that of one proximal projection step.

The unstructured $l_p$-norms do not take into account the varying sparsity level with context length. For p=1, this leads to a sparse solution. For p=2, the classical quadratic penalty is obtained. The suffix tree representation leads to an efficient memory usage. Furthermore, to make the training algorithm time efficient, the parameter values corresponding to features that are always equal, that is to say the contexts which always occur in the same larger context, can be grouped. However, the corresponding losses would be data dependent. This becomes particularly important when considering online algorithms (see, e.g. Dekel et al., "Individual sequence prediction using memory-efficient context trees", *IEEE Trans. On Information Theory* vol. 55(11), pp. 5251-62 (2009)) when a group could be split upon making new observations. Experiments reported herein illustrate that these penalties do not lead to good predictive performances.

---

Algorithm 4 $w := \Pi_{l_\infty^T}(w, \kappa)$ Proximal projection step for $l_\infty^T$ on grouping $\mathcal{G}$ using heap data structure.

---

Input: T suffix tree, w = [v c] tree-structured vector v with corresponding number of suffixes collapsed at each node in c, $\kappa$ threshold
Initialize $\mathcal{H} = \{\}$ # empty set of heaps
1 for $x \in$ DepthFirstNodeTraversal(T, PostOrder)
    $g(v, x) := \pi_{l_\infty^T}(w, x, c_x\kappa, \mathcal{H})$
    Procedure: $q := \pi_{l_\infty}(w, x, \kappa, \mathcal{H})$
1    $\mathcal{H}_x$ = NewHeap($v_x, c_x, v_x$)
2    for $j \in$ children(x)        # merge with child heaps
    $\tau_x = \tau_x + \tau_j$        # update $l_1$-norm
    $\mathcal{H}_x$ = Merge($\mathcal{H}_x, \mathcal{H}_j$), $\mathcal{H} = \mathcal{H} / \mathcal{H}_j$
3    $\mathcal{H} = \mathcal{H} \cup H_x$, S = 0, C = 0, J = { }
4    if $\mathcal{H}_x(\tau) < \kappa$, set $\mathcal{H}_x = 0$ return
5    for $j \in$ OrderedIterator($\mathcal{H}_x$)    # get max values     if $v_j > \dfrac{S + (v_j \cdot c_j) - \kappa}{C + c_j}$     S = S + ($v_j \cdot c_j$), C = C + $c_j$, J = J ∪ {j}
    else break 6    $r = \dfrac{S - \kappa}{C}, \delta = 0$    # compute threshold 7    for $j \in$ J        # apply threshold
    v = min($v_j$, r), $\delta = \delta + (v_j - v)$
    $\mathcal{H}_j(v) = v$
8    $\mathcal{H}_x(\tau) = \mathcal{H}_j(\tau) - \delta$    # update $l_1$-norm

--- a. Heap structure on vector w holds three values (v, c, τ) at each node. v, c being value and its count, τ is the $l_1$-norm of the sub-vector below. Tuples are ordered by decreasing value of v and $\mathcal{H}_j$ refers to heap with values in sub-tree rooted at j. Merge operation merges the heaps passed. OrderedIterator returns values from the heap in decreasing order of v.

The $l_2^T$-norm nicely groups features by subtrees which concors with the sequential structure of sequences. This leads to a powerful algorithm in terms of generalization. But it can only be applied on the uncollapsed tree since there is no closure property of the constant value non-branching path for its proximal step making it less amenable for larger tree depths.

The $l_\infty^T$-norm groups features like the $l_2^T$-norm. Additionally, however, the $l_\infty^T$-norm encourages numerous feature groups to share a single value, leading to a substantial reduction in memory usage. The generalization properties of this algorithm is as good as the generalization obtained with the $l_2^T$ penalty, if not better. However, it has the constant value non-branching path property, which means that the proximal step can be applied directly to the suffix tree. There is thus also a significant gain of performance.

TABLE 1

| Penalty | Good generalization? | Memory efficient? | Time efficient? |
|---|---|---|---|
| Unstructured $l_1$ and $l_2^2$ | No | Yes O(|T|) | Yes O(|T|) |
| Structured $l_2^T$ | Yes | No O(|S|) | No O(|S|) |
| Structured $l_T^\infty$ - random pivot | Yes | Yes O(|T|) | No O(|T|$^2$) |
| Structured $l_T^\infty$ - heap | Yes | Yes O(|T|) | Yes O(|T|log|T|) |

With returning reference to FIG. 1, a language model learning system employing one of the disclosed language learning techniques disclosed herein is described. The language model learning system operates on the corpus 20 (optionally preprocessed, operation not shown in FIG. 1, for example as described for experiments reported herein), and minimizes the loss-log objective 12 (Equation (2)) including the penalty function 14 ($\Omega(W)$) employing a tree-structured $l_p$-norm, such as $l_2^T$ or $l_\infty^T$. A suffixes extraction module 30 operates on the corpus 20 to extract the suffixes (i.e. contexts) to a designated maximum depth 32 (denoted m herein) from the sentences of the corpus 20. The suffixes extraction module 30 includes a suffix tree encoder 34 that encodes the suffixes in uncollapsed trie structures S and/or collapsed tree structures T (by operation of a suffix tree collapse component 36 of the suffix tree encoder 34, for example suitably operational when the penalty function 14 employs a tree-structured $l_\infty^T$-norm).

One illustrative approach for mapping a sequence x to its feature vector $\phi_m(x)$ is as follows. Let $x_k$ denote the suffix of length k of the sequence x, that is, $x_k$ is the sequence of the last k symbols in x. If x is followed by y, then the set of suffixes $\{x_k\}_{k=1}^n$ $\{x_k\}_{k=1}^n$ defines the context in which y is observed. Further, let $\xi^k$ denote the lexicographically ordered set of all length-k sequences formed with the elements of V. For example, the set $\xi^2$ for V={a, c, o} is given by {aa, ac, ao, ca, cc, co, oa, oc, oo}. A mapping from sequences x to binary vectors $\psi_k(x)$ indicating the location of the suffix $x_k$ in the set $\xi^c$ is defined as:

$$\psi_k(x) = [\mathbb{I}_{(\xi^k(1) = x_k)} \mathbb{I}_{(\xi^k(2) = x_k)} \ldots \mathbb{I}_{(\xi^k(|V|^k) = x_k)}]^T \quad (13)$$

Where $\mathbb{I}(\bullet)$ is the indicator function. For example, for x=oacac and $x_2$=ac, Equation (13) yields $\psi_2(x)$= $[010000000]^T$. The feature vector $\phi_m(x)$ encodes all suffixes observed in x up to length m. It is obtained by stacking a weighted version of the corresponding binary vectors $\{\psi_k(x)\}_{k=1}^m$:

$$\phi_m(x) = [\beta(0)\psi_0(x)^T \beta(1)\psi_1(x)^T \ldots \beta(m)\psi_m(x)^T]^T. \quad (14)$$

where the function (k) weighs suffixes depending on their length k. If $\beta(k)=1$ is chosen for all k, then the suffixes of all lengths are equally weighted. The first entry $\psi_0$ is a non-zero value indicating the null context. Moreover, $\phi_m(x)$ discards all suffixes longer than m, restricting the maximal length of the context. $\phi_m(x)$ encodes occurrences of various suffixes, while the parameters W provide a weighting of the context of different length. However, the dimension of the feature space $\Sigma_{k=1}^m |V|^k$, meaning that the number of entries in W becomes rapidly unmanageable using standard data structures when the context length increases (as the vocabulary size |V| is typically in the order of $10^4$ or larger in language models). This causes storage and computational issues, at training and test time. However, in practice $\phi_m(xy)$ has only m non-zeros elements due to the sequential dependencies between successive symbols. Suffix trees are well suited to encode these data.

Figure 6:
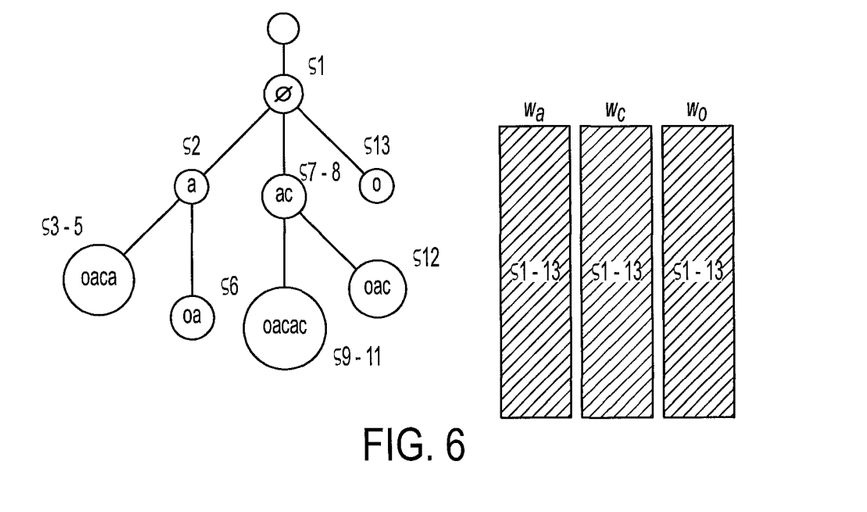
FIGS. 6 and 7 illustrate an embodiment of calculation of suffix trees (FIG. 6) and corresponding word-specific suffix tries.
Figure 7:
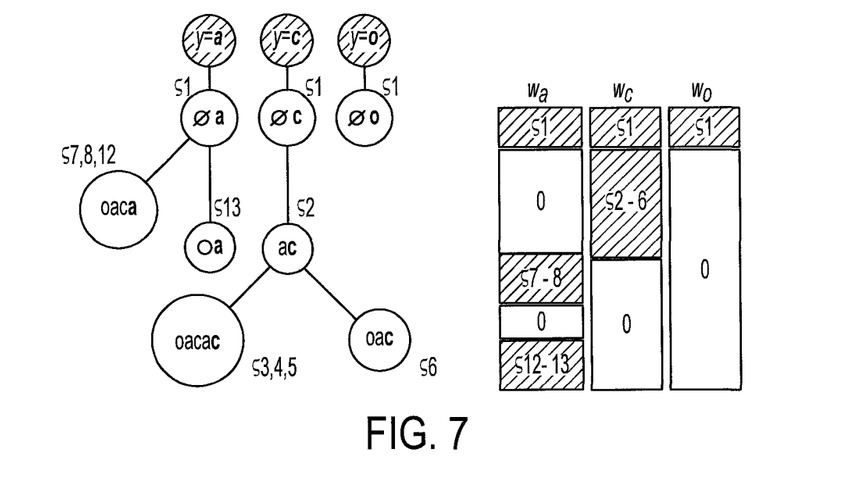

With reference to FIGS. 6 and 7, the feature vector $\phi_m(x)$ encodes suffixes (or contexts) of increasing length and it corresponds to one path of length m starting at the root of $S(x)$. Thus, when building the log-linear language model, it is sufficient to consider weight vectors of size $|S(x)|$. In other words, there is one weight parameter per suffix per symbol and the matrix of parameters W is of size $|S(x)||V|$. As illustrated in FIGS. 6 and 7, each column of W contains the weight vector $w_v$ associated with symbol $v \in V$ and $|S(x)|=13$ (for the illustrative example of m=13). The dimension of the weight vectors is bounded by the length of the training sequence. Hence, the model can be used as an infinite length language model, though in practice it makes sense to restrict dependency to the sentence length (or the document length). In illustrative FIGS. 6 and 7, the example sequence x=oacac and a vocabulary V={a,c,o} is considered as a simple example. The set $\{\varsigma_j\}_{j=1}^{13}$ contains all the suffixes appearing in the sequence x. In FIG. 6, left side, the suffix tree T(x) is shown. In FIG. 6, right side, the matrix W associated with the corresponding suffix trie is shown. In FIG. 7, left side, word-specific suffix trees $\{T_v(x)\}_{v \in V}$ are shown. In FIG. 7, right side, constrained matrix W associated with the word-specific suffix tries are shown.

Making use of the suffix trie encoding additionally offers the computational benefit of efficient matrix-vector (or vector-vector multiplication). Indeed, each inner product $w_v^T \phi_m(x)$ reduces to (i) finding the longest suffix of x of maximal length m in S(x), (ii) extracting the corresponding entries of and (iii) summing them after proper scaling with $\beta(\cdot)$. Again, this is a substantial gain as the longest suffix of x is much smaller than $|S(x)|$ and summations over weights that are irrelevant in a specific context are avoided.

With continuing reference to FIG. 1, a proximal gradient objective optimization module 40 optimizes Equation (2) with respect to W as disclosed herein, for example using the proximal projection step of Algorithm 2 if the penalty 14 is the structured $l_2^T$-norm, the proximal projection step of Algorithm 3 if the penalty 14 is the $l_\infty^T$-norm and random pivot is employed, or the proximal projection step of Algorithm 4 if the penalty 14 is the $l_\infty^T$-norm and a heap data structure is used. The resulting trained log-linear language model 10 is suitably used as the language model module in an application 44 such as a speech recognition application, machine translation application, information retrieval application, and so forth.

The processing components shown in FIG. 1 are implemented by an illustrative computer 50 or other electronic data processing device programmed to perform the disclosed processing. Additionally or alternatively, the disclosed language model learning and application approaches are suitably embodied by a non-transitory storage medium storing instructions executable by the illustrative computer 50 or other electronic data processing device to perform the disclosed language model learning and application approaches. The non-transitory storage medium may, for example, comprise a hard disk or other magnetic storage medium, an optical disk or other optical storage medium, a random access memory (RAM), read-only memory (ROM), flash memory or other electronic storage medium, various combinations thereof, or so forth.

In the following, experiments are described that demonstrate empirically the properties of the algorithms summarized in Table 1. Four distinct subsets of the Associated Press News (AP-news) text corpus are considered, with train-test sizes of 100,000 to 20,000 for the reported experiments. The corpus was preprocessed as described in Bengio et al., "A neural probabilistic language model", *Journal of Machine Learning Research* vol. 3 pages 1137-55 (2003), by replacing proper nouns, numbers and rare words with special symbols "<proper noun>", "#n" and "<unknown>" respectively. Punctuation marks are retained which are treated like other normal words. Vocabulary size for each of the training subsets was around 8,500 words. The model was reset at the start of each sentence, meaning that a word in any given sentence does not depend on any word in the previous sentence. The regularization parameter $\lambda$ was chosen for each model by cross-validation on a smaller subset of data. Models were fitted to training sequence of 30,000 words for different values of $\lambda$ and validated against a sequence of 10,000 words to choose $\lambda$.

The experimental results were quantitatively evaluated using perplexity, which is computed as follows:

$$P(\{x_i, y_i\}, W) = 10^{\left\{\frac{-1}{n_V} \sum_{i=1}^n \mathbb{I}(y_i \in V) \log p(y_i | x_{1:i}; W)\right\}} \quad (15)$$

where $n_V = \Sigma_i \mathbb{I}(y_i \in V)$. Performance was measured for varying depth of the suffix trie with different penalties. Interpolated Kneser-Ney results were computed using the openly available SRILM toolkit (Stolcke, "Srilm—an extensible language modeling toolkit", *Proc. Int. Conf. Spoken Language Processing*, $2^{nd}$ edition (2002)).

Figure 8:
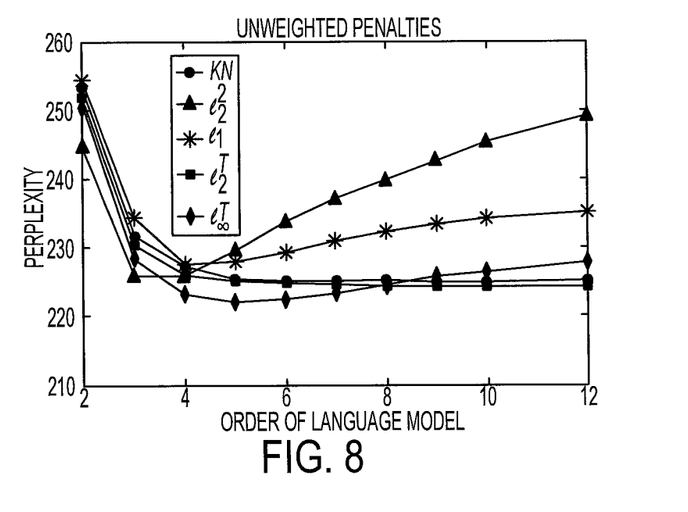
FIGS. 8-12 present experimental results as described herein.

FIG. 8 shows perplexity values averaged over four data subsets as a function of the language model order. It can be observed that performance of unstructured $l_1$ and squared $l_2$ penalties improve until a relatively low order and then degrade, while $l_2^T$ penalty does not show such degradation, indicating that taking the tree-structure into account is beneficial. Moreover, the log-linear language model with $l_2^T$ penalty performs similar to interpolated Kneser-Ney. The $l_\infty^T$-norm outperforms all other models at order 5, but taking the structure into account does not prevent a degradation of the performance at higher orders, unlike $l_2^T$. This could be explained by the fact that $l_\infty^T$-norm is not sparsity-inducing, unlike the $l_2^T$-norm, which means that a single regularization for all model orders is inappropriate.

To investigate this further, the penalties were adjusted by choosing an exponential decrease of weights varying as $\alpha^m$ for a feature at depth m in the suffix tree. Parameter $\alpha$ was tuned on a smaller validation set. The best performing values for these weighted models $wl_2^2$, $wl_1$, $wl_2^T$, and $wl_\infty^T$ are 0.5, 0.7, 1.1, and 0.85 respectively. The weighting scheme further appropriates the regularization at various levels to suit the problem's structure.

Figure 9:
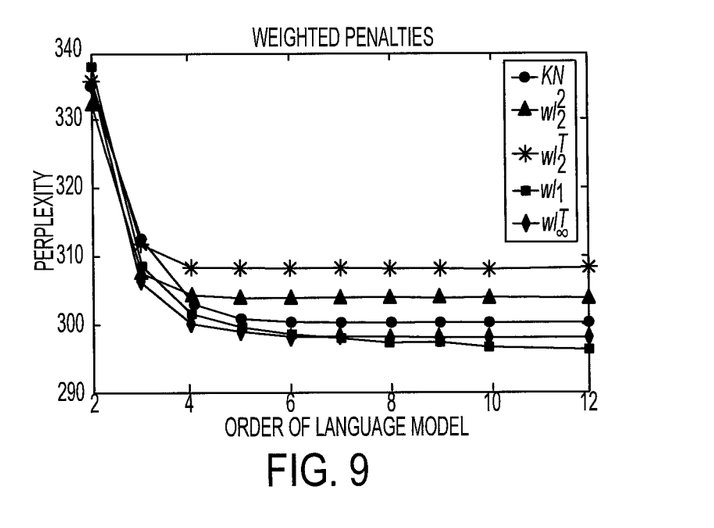

Perplexity plots for weighted models are shown in FIG. 9. While $wl_1$ improves at larger depths, it fails to compare to others showing that the problem does not admit sparse solutions. $wl_2^2$ improves considerably and performs comparably to tree-structured norms. $wl_\infty^T$ is corrected for overfitting at larger depths and $wl_2^T$ gains more than others. Optimal values for $\alpha$ are fractional for all norms except $wl_2^T$-norm showing that the unweighted model $l_2^T$-norm was over-penalizing features at larger depths, while that of others were under-penalizing them. Interestingly, perplexity improves up to about 9-grams with $wl_2^T$ penalty for the considered data set, indicating that there is more to gain from longer dependencies in natural language sentences than what is currently believed.

Figure 10:
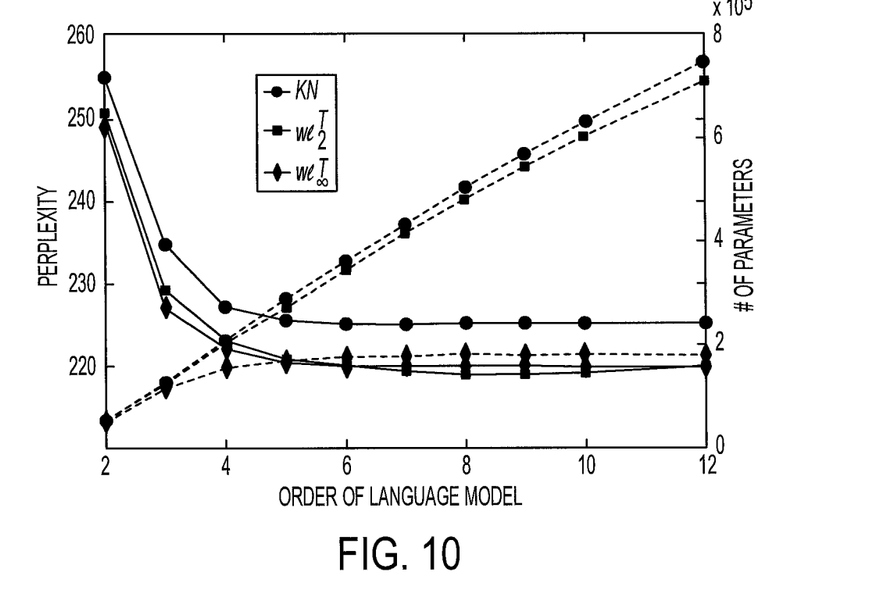

FIG. 10 shows model complexity measured by the number of parameters in the model. The $l_2^T$ penalty is applied on trie-structured vectors, which grows roughly at a linear rate with increasing model order. This is similar to Kneser-Ney. However, the number of parameters for the $wl_\infty^T$ penalty grows logarithmically with the model order. This is due to the fact that it operates on the suffix tree-structured vectors instead of the suffix trie-structured vectors. These results are valid for both weighted and unweighted penalties.

Figure 11:
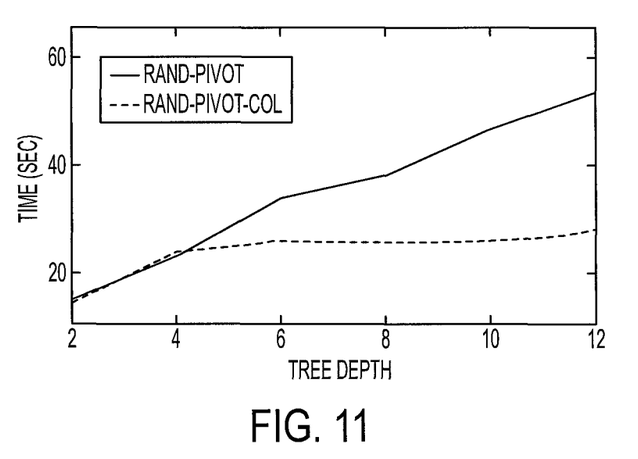
Figure 12:
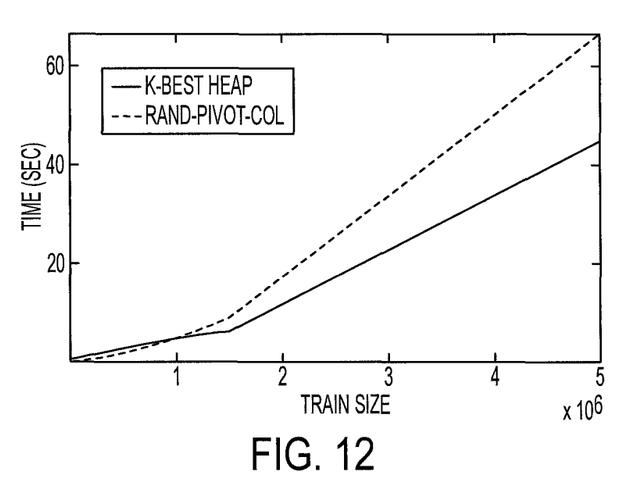

With reference to FIGS. 11 and 12, the average time taken per iteration is compared for different implementations of the $l_\infty^T$ proximal step. FIG. 11 shows this time against increasing depth of the language model order for random pivoting method with and without the collapsing of parameters at different constant value non-branching paths. The trend in this plot resembles that of the number of parameters in FIG. 10. This shows that the complexity of the full proximal step is sublinear when accounting for the suffix tree data structure. FIG. 12 plots time per iteration for random pivoting and for k-best heap against the varying size of training sequence. The two algorithms are operating directly on the suffix tree. It is observed that the heap-based method are superior with increasing size of training data.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions readable and executable by an electronic data processing device to perform a method of generating a language model for a natural language including the operations of:
   optimizing a penalized loss $\mathrm{argmin}_w f(W)+\lambda\Omega(W)$ using a corpus of language samples of the natural language respective to a set of parameters $W=\{w_v\}_{v \in V}$ of a language model, where $V$ is a vocabulary of the natural language, $f(W)$ is a function measuring predictive accuracy of the language model respective to the corpus of language samples, $\Omega(W)$ is a penalty comprising a tree-structured norm, and $\lambda$ is a regularization parameter; and
   outputting a trained language model for the natural language with optimized values for the parameters $W$ generated by the optimizing.

2. The non-transitory storage medium of claim 1 wherein the penalty $\Omega(W)$ comprises $l_p^T(w)=\Sigma_{j \in \mathcal{G}} \|g(w,j)\|_p$ where $\|\cdot\|_p$ denotes the $l_p$-norm, $g(w,j)$ is the sub-vector of $w$ associated with the subtree rooted at node $j$ of the suffix trie of a language sample of the corpus, and $\mathcal{G}$ is an ordered set of nodes of the suffix trie.

3. The non-transitory storage medium of claim 2 wherein the penalty $\Omega(W)$ comprises $4(w)=\Sigma_{j \in \mathcal{G}} \|g(w,j)\|_2$ where $\|\cdot\|_2$ denotes the $l_2$-norm.

4. The non-transitory storage medium of claim 2 wherein the penalty $\Omega(W)$ comprises $l_\infty^T(w)=\Sigma_{j \in \mathcal{G}} \|g(w,j)\|_\infty$ where $\|\cdot\|_\infty$ denotes the $l_\infty$-norm.

5. The non-transitory storage medium of claim 4 wherein the suffix trie comprises a collapsed suffix trie in which any series of suffixes of increasing lengths which are always observed in the same context are collapsed into a single node.

6. The non-transitory storage medium of claim 1 wherein $f(W):=-\Sigma_{i=1}^n \ln p(y_i|x_{1:i}; W)$ where the summation is over n language samples of the corpus and $p(y_i|x_{1:i}; W)$ denotes the probability of word $y_i$ following suffix $x_{1:i}$ predicted by the language model with parameters W.

7. The non-transitory storage medium of claim 1 wherein the optimizing is performed using a proximal step algorithm.

8. The non-transitory storage medium of claim 7 wherein the optimizing is performed using a stochastic proximal step algorithm.

9. The non-transitory storage medium of claim 7 wherein the penalty $\Omega(W)$ comprises $l_\infty^T(w)=\Sigma_{j \in \mathcal{G}} \|g(w,j)\|_\infty$ where $\|\cdot\|_\infty$ denotes the $l_\infty$-norm, $g(w,j)$ is the sub-vector of $w$ associated with the subtree rooted at node $j$ of the suffix trie of a language sample of the corpus, and $\mathcal{G}$ is an ordered set of nodes of the suffix trie.

10. The non-transitory storage medium of claim 9 wherein the optimizing implements the proximal step algorithm using a max-heap data structure.

11. An apparatus comprising:
    a non-transitory storage medium as set forth in claim 1; and
    an electronic data processing device operatively connected to read and execute the instructions stored on the non-transitory storage medium.

12. A method comprising:
    optimizing a penalized loss using a corpus of language samples of a natural language respective to a set of parameters of a language model wherein the penalized loss includes a function measuring predictive accuracy of the language model respective to the corpus of language samples and a penalty comprising a tree-structured norm to generate a trained language model for the natural language; and
    applying the trained language model with optimized values for the parameters generated by the optimizing to predict a word following a sequence of words of the natural language modeled by the trained language model;
    wherein the optimizing and the applying are performed by an electronic data processing device.

13. The method of claim 12 wherein the penalty comprises a tree-structured $l_p$-norm.

14. The method of claim 13 wherein the penalty comprises a tree-structured $l_2$-norm.

15. The method of claim 13 wherein the penalty comprises a tree-structured $l_\infty$-norm.

16. The method of claim 15 wherein the tree-structured $l_\infty$-norm operates on a collapsed suffix trie in which any series of suffixes of increasing lengths which are always observed in the same context are collapsed into a single node.

17. The method of claim 12 wherein the optimizing is performed using a proximal step algorithm.

18. The method of claim 17 wherein the optimizing is performed using a stochastic proximal step algorithm.

19. The method of claim 17 wherein the penalty comprises a tree-structured $l_\infty$-norm operating on a collapsed suffix trie in which any series of suffixes of increasing lengths which are always observed in the same context are collapsed into a single node.

20. The method of claim 19 wherein the optimizing implements the proximal step algorithm using a max-heap data structure.

* * * * *